United States Patent [19]

Lemmeyer

[11] 4,390,381

[45] Jun. 28, 1983

[54] YARN COLORING PICTURE SET AND METHOD OF COLORING

[75] Inventor: Gary R. Lemmeyer, East Aurora, N.Y.

[73] Assignee: The Quaker Oats Company, Chicago, Ill.

[21] Appl. No.: 376,669

[22] Filed: May 10, 1982

Related U.S. Application Data

[62] Division of Ser. No. 228,871, Jan. 27, 1981, Pat. No. 4,355,722.

[51] Int. Cl.[3] .......................... B32B 31/00; A01C 1/00; B65D 69/00

[52] U.S. Cl. .......................................... 156/63; 156/257; 156/297; 156/344; 428/261

[58] Field of Search .......................... 156/63, 62.2, 62.4, 156/274, 230, 265, 297, 584, 517, 344, 391, 248, 257, 249, 247, 513; 206/575, 223; 242/7.06, 96, 129.6, 129.62, 140, 146, 137; 57/10; 46/16, 35, DIG. 1; 428/195, 261, 302, 202, 203, 245

[56] References Cited

U.S. PATENT DOCUMENTS

| | | | |
|---|---|---|---|
| 2,876,575 | 3/1959 | Leika | 156/248 |
| 3,615,094 | 10/1971 | Connor | 156/257 |
| 3,649,400 | 3/1972 | Sawaki et al. | 156/63 |
| 3,770,535 | 11/1963 | Morrison | 428/195 |
| 4,083,740 | 4/1978 | Hamanaka | 206/575 |

FOREIGN PATENT DOCUMENTS

| | | | |
|---|---|---|---|
| 48699 | 4/1934 | Denmark | 242/129.62 |
| 2041835 | 9/1980 | United Kingdom | 156/63 |

*Primary Examiner*—Edward C. Kimlin
*Assistant Examiner*—Lou Falasco
*Attorney, Agent, or Firm*—Cumpston & Shaw

[57] ABSTRACT

A yarn coloring picture set for coloring a picture by applying colored yarn thereto. In a method for practicing the invention, a board is provided covered by an adhesive layer. A cover sheet protectively overlaps the adhesive layer. A picture is die-cut through the cover sheet to form adjacent die-cut cover sheet sections. To color a yarn picture on the board, the cover sheet sections are selectively removed, and different colored yarns applied to the exposed parts of the adhesive layer.

3 Claims, 4 Drawing Figures

YARN COLORING PICTURE SET AND METHOD OF COLORING

This application is a division of application Ser. No. 228,871, filed Jan. 27, 1981, now U.S. Pat. No. 4,355,722.

BACKGROUND OF THE INVENTION

1. Field of the Invention

The present invention relates generally to a picture coloring set for children. More particularly, the present invention is concerned with a yarn coloring picture set in which a picture having an adhesive coating is colored by applying colored yarn to discrete portions of the adhesive coating.

2. Description of the Prior Art

Crayon and paint coloring sets for coloring a picture divided into numbered sections on a receiving sheet or board are well known in the art.

It is also known, of which U.S. Pat. No. 2,876,575 is exemplary, to provide a receiving sheet or board having a picture divided into numbered sections. The picture has an adhesive coating covered by a cover sheet die-cut along the outlines of the numbered sections. The picture is colored by a colored powder by selectively removing the sections, sprinkling a properly colored powder on the exposed adhesive layer, rubbing the powder onto the layer, and removing the non-adhering powder.

SUMMARY OF THE INVENTION

It is a primary object of the present invention to provide a novel yarn coloring picture set, and method for coloring a picture with colored yarn.

In a preferred embodiment of the invention, a picture receiving sheet or board is provided having an adhesive layer coated thereon. A cover sheet protectively overlaps the adhesive layer, and has a picture die-cut therethrough to form adjacent die-cut cover sheet sections. The cover sheet sections are selectively removed, and properly colored yarns applied to the exposed parts of the adhesive layer. The applied yarn adheres to the parts of the adhesive layer to form a yarn colored picture.

In one aspect of the invention, the board has a picture formed of different colored areas imprinted on the board underneath the adhesive layer. The cover sheet is die-cut so that the die-cut cover sheet sections are in register with the colored areas.

In another aspect of the invention, the yarn is applied to the exposed parts of the adhesive layer by a yarn pencil. The pencil comprises a housing, a spool rotatably mounted within the housing upon which yarn is wound, and an an opening at one end of the pencil through which the yarn is fed from the spool and applied to the exposed parts of the adhesive layer.

A primary advantage of the yarn coloring set of this invention in all of its aspects is to eliminate the use and handling of messy liquids, pastes and powders. Such liquids, pastes and powders, particularly when handled by children, are inadvertently spilled on or applied to clothes, rugs, walls, and furniture, for example. Irreparable damage can result, and in any event, extensive cleaning is required. Such liquids, pastes and powders may appeal to a child's taste, and could present a health hazard, if tasted or swallowed.

The invention and its advantages will become more apparent from the detailed description of the invention presented below.

BRIEF DESCRIPTION OF THE DRAWINGS

The details of the invention will be described in connection with the accompanying drawings, in which.

DETAILED DESCRIPTION OF THE INVENTION

Figure 1:
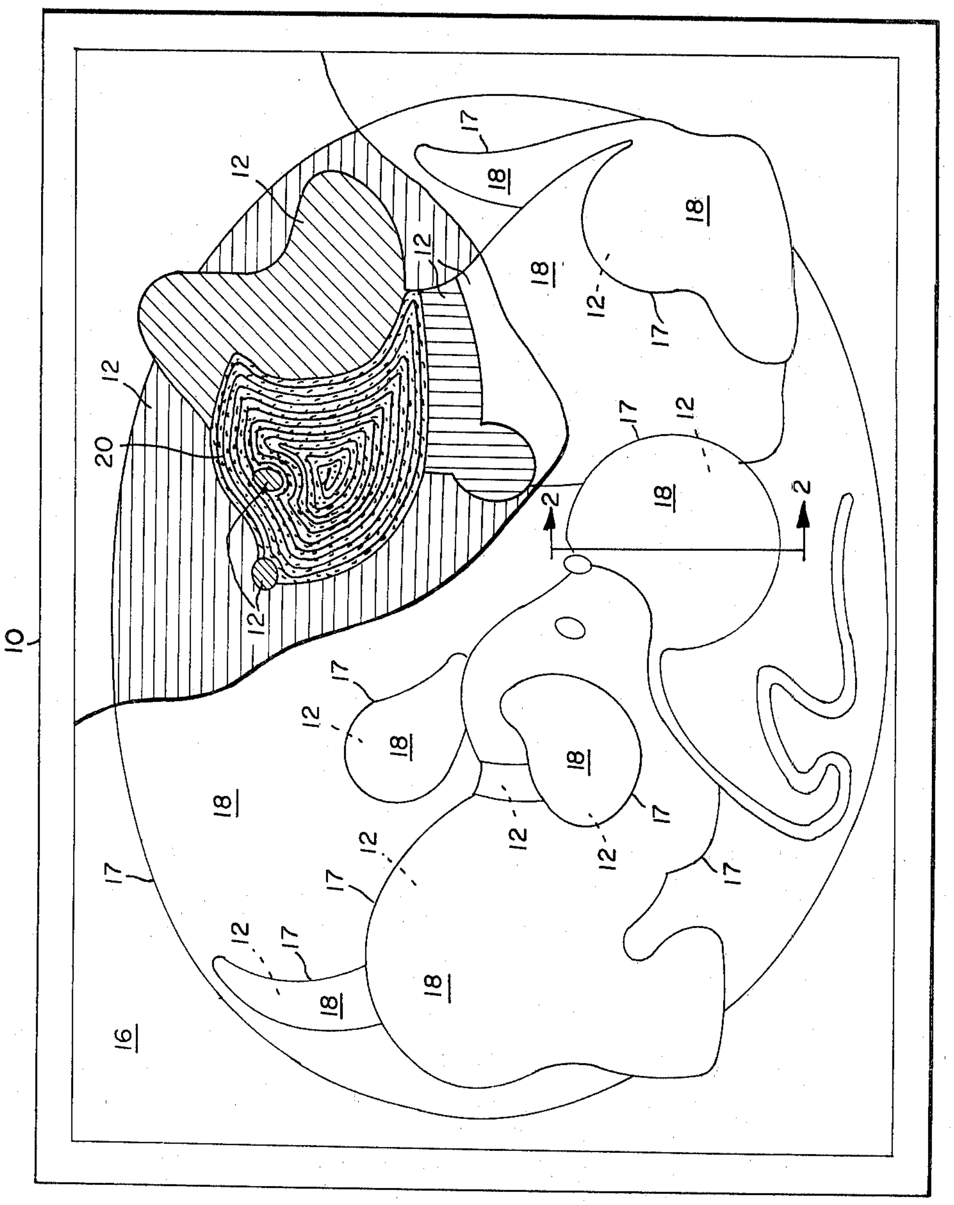
FIG. 1 is a top plan view of a portion of the yarn coloring picture set of this invention with a portion of the cover sheet removed and yarn applied to a colored area.
Figure 2:
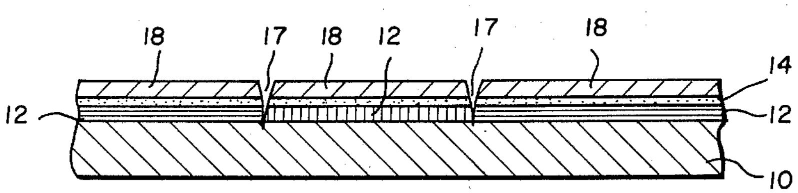
FIG. 2 is an enlarged segmental view in section taken substantially along line 2—2 of FIG. 1.

Referring to FIG. 1 of the drawings, a base board 10 formed from any suitable flexible or rigid material, such as cardboard, is provided. Any suitable design or object such as a dog, flower, ship, bird, for example, formed from one or more colored areas 12 of varied shape is imprinted by any suitable means on the upper surface of the board. A preferably transparent adhesive coating 14 of any suitable adhesive material is applied over the colored design. A cover sheet 16 formed from any suitable wax material, for example, that only lightly adheres to adhesive coating 14 is placed over the adhesive coating to protect it. Cover sheet 16 is die-cut by any suitable die-cutting device, not shown, which preferably penetrates through the cover sheet only. The cover sheet is die-cut along lines 17 in register or alignment with the outlines of the colored areas 12. This results in the formation of a plurality of die-cut cover sheet sections 18 in register with and of substantially the same shape as the colored areas 12 therebelow.

To color a picture with colored yarn 20, the procedure is to remove a cover sheet section 18 exposing the adhesive coating 14 on a colored area 12. A colored yarn 20 matching the colored area is then applied to the colored area, preferably along one or more paths, with edge portions of the yarn in adjoining relation until the colored area 12 is completely covered by yarn. The same procedure is then followed for the remaining cover sheet sections 18, preferably one at a time, until the entire picture is colored by yarn 20. When complete, the side margins of board 10 may be trimmed, and the board mounted in any suitable frame, not shown.

Figure 3:
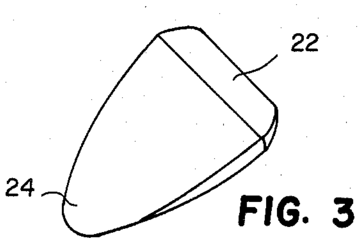
FIG. 3 is a perspective view of a scraper for removing cover sheet sections from the board.

With reference to FIG. 3, a scraper 22 is shown of any suitable shape, and preferably formed from a plastic material, for removing the cover sheet sections 18. The scraper has a relatively thin, pointed end 24 which is insertable under an edge of a cover sheet section 18 for lifting the edge and allowing the cover section to be grasped and removal from the adhesive coating.

Figure 4:
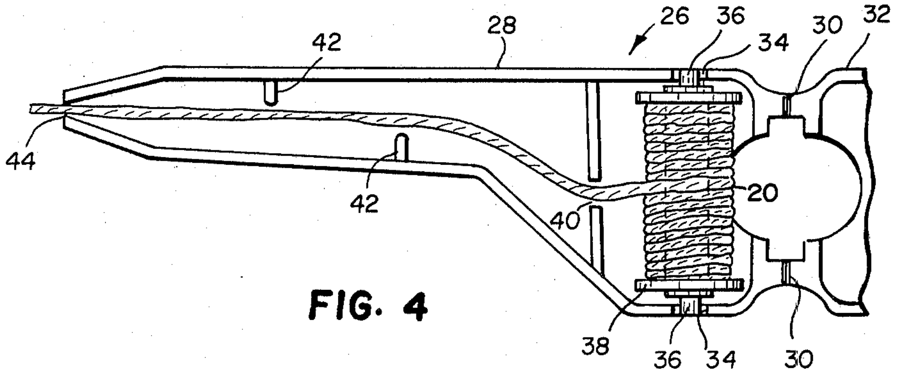
FIG. 4 is a side elevational section view of a yarn pencil for applying yarn to an exposed part of the adhesive layer.

Referring to FIG. 4, one part of a yarn pencil 26 is shown for applying the colored yarn 20 to an exposed colored area. Pencil 26 comprises a dished housing 28 connected by a living hinge 30 to a complementary cover housing 32, shown in part only. Housing 28 has side notches 34 for rotatably receiving stub shafts 36 of a yarn spool 38. Yarn 20 of any selected color is wound on the spool, and the spool inserted in housing 28. The yarn end is threaded through a slot 40, guides 42 and an exit opening 44. The cover housing 32 is closed, and any suitable detent or latch, not shown, may be provided on the housing for releasably latching the housing parts 28, 32 together. The yarn pencil 26 is now fully loaded, and in condition, when manually manipulated, to apply and press yarn 20 onto an exposed colored area 12 along any chosen path or paths until the colored area is completely covered.

In an alternative embodiment of the invention, the design imprinted on the board can be formed of uncolored rather than colored areas. In this embodiment, more imagination, ingenuity and decision making is required since the child is free to choose and use yarn of any color for any uncolored area. In the previous described embodiment, the child will normally follow the color design provided by the colored areas 12.

While a presently preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

What is claimed is:

1. A method for coloring a picture with colored yarn comprising the steps of:

providing a board having an adhesive layer covered by a cover sheet;

die-cutting the outlines of picture segments through said cover sheet to form adjacent die-cut cover sheet sections;

selectively removing said cover sheet sections to expose different colored parts of the adhesive layer therebelow; and pressing different colored yarns to said exposed parts of said adhesive layer, said yarn adhering to said adhesive layer to form a yarn colored picture wherein the step of pressing colored yarns is achieved by a manually operated yarn pencil having a housing, a spool rotatably mounted within said housing upon which yarn is wound, and an opening at one end of said pencil through which an end of the yarn is fed and pressed onto said exposed parts of said adhesive layer.

2. A method for coloring a picture according to claim 1 wherein the step of applying colored yarns is achieved by pressing the yarn onto said exposed parts of said adhesive layer while feeding said yarn along one or more paths with portions of said yarn in adjoining relation until said exposed parts are completely covered by said yarn.

3. A method for covering a picture according to claim 1 in which the board has a picture imprinted thereon formed of different colored areas under said adhesive layer and said cover sheet, and during the die-cutting step said outlines of said picture segments are die-cut substantially in register with the outlines of said colored areas whereby when one of said cover sheet sections is removed said exposed colored area indicates the color of yarn to be applied to said exposed colored area.

* * * * *